United States Patent
Roeland et al.

(10) Patent No.: US 12,461,994 B2
(45) Date of Patent: Nov. 4, 2025

(54) USER PLANE SELECTION USING REINFORCEMENT LEARNING

(71) Applicant: Telefonaktiebolaget LM Ericsson (publ), Stockholm (SE)

(72) Inventors: Dinand Roeland, Sollentuna (SE); Andreas Yokobori Sävö, Täby (SE); Jaeseong Jeong, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 929 days.

(21) Appl. No.: 17/636,990

(22) PCT Filed: Aug. 30, 2019

(86) PCT No.: PCT/SE2019/050813
§ 371 (c)(1),
(2) Date: Feb. 21, 2022

(87) PCT Pub. No.: WO2021/040592
PCT Pub. Date: Mar. 4, 2021

(65) Prior Publication Data
US 2022/0358335 A1    Nov. 10, 2022

(51) Int. Cl.
*G06F 18/21* (2023.01)
*G06F 17/16* (2006.01)

(52) U.S. Cl.
CPC ............ *G06F 18/217* (2023.01); *G06F 17/16* (2013.01)

(58) Field of Classification Search
CPC ....... G06F 18/217; G06F 17/16; G06N 3/006; G06N 3/084; H04L 41/0895; H04L 41/40; H04L 41/046; H04L 43/0817; H04L 43/0852; H04L 41/5009; H04L 41/5019; H04L 41/0806; H04W 16/18
See application file for complete search history.

(56) References Cited

U.S. PATENT DOCUMENTS

2014/0200036 A1    7/2014    Egner et al.

FOREIGN PATENT DOCUMENTS

| CN | 109120457 A | 1/2019 |
| CN | 105636062 B | 2/2019 |
| CN | 109743735 A | 5/2019 |

(Continued)

OTHER PUBLICATIONS

International Search Report and Written Opinion of the International Searching Authority for PCT International Application No. PCT/SE2019/050813 dated Jun. 1, 2020.

(Continued)

*Primary Examiner* — Pei Yong Weng
(74) *Attorney, Agent, or Firm* — Sage Patent Group

(57) ABSTRACT

A method of reinforcement learning is used for placement of a plurality of service functions at nodes of a telecommunications network. The state of the system is defined by an allocation matrix, wherein each first vector of the allocation matrix corresponds to a respective one of the nodes of the telecommunications network, each second vector of the allocation matrix corresponds to a respective one of the plurality of service functions. Moreover, each cell of the allocation matrix contains a value 1 if the one of the plurality of service functions corresponding to the respective second vector is placed on the one of the nodes of the telecommunications network corresponding to the respective first vector, and otherwise contains a value 0.

17 Claims, 11 Drawing Sheets

(56) References Cited

FOREIGN PATENT DOCUMENTS

CN      109768940 A     5/2019
WO      2019139510 A1   7/2019

OTHER PUBLICATIONS

Tavakoli-Someh et al., "Multi-objective virtual network function placement using NSGA-II meta-heuristic approach," The Journal of Supercomputing, (2019) 75: pp. 6451-6487.
Gai et al., "Fusion of Cognitive Wireless Networks and Edge Computing," Technical report of Wireless Networking Group, IEEE Wireless Communications Jun. 2019, vol. 26, Issue: 3: pp. 69-75.
Florensa et al., "Automatic Goal Generation for Reinforcement Learning Agents," Proceedings of the 35th International Conference on Machine Learning, Stockholm, Sweden, PMLR 80, 2018, 14 pages.
Communication pursuant to Rule 164(1) EPC regarding the partial supplementary European search report and provisional opinion for European Patent Application No. 19943405.1 dated Apr. 12, 2023.
Zhang et al., "Q-Placement: Reinforcement-Learning-Based Service Placement in Software-Defined Networks", 2018 IEEE 38th International Conference on Distributed Computing Systems (ICDCS), IEEE, Jul. 2, 2018 (Jul. 2, 2018), pp. 1527-1532.
Reynolds et al., "Provisioning Norm: An Asymmetric Quality Measure for SaaS Resource Allocation", 2011 IEEE International Conference On Services Computing (SCC), IEEE, Jul. 4, 2011 (Jul. 4, 2011), pp. 112-119.

USER PLANE SELECTION USING REINFORCEMENT LEARNING

CROSS REFERENCE TO RELATED APPLICATION

This application is a 35 U.S.C. § 371 national stage application of PCT International Application No. PCT/SE2019/050813 filed on Aug. 30, 2019, the disclosure and content of which is incorporated by reference herein in its entirety.

TECHNICAL FIELD

This relates to a telecommunications network, and in particular to the placement of a plurality of service functions at nodes of the telecommunications network.

BACKGROUND

In a telecommunications network, a user sends data packets from a source to a destination. The network performs actions on these packets, such as counting, bandwidth limiting, charging, header enrichment, QoS handling, deep-packet inspection, etc. Together these actions are called "the service" for the user. Each action is referred to as a Service Function (SF).

Each SF for a specific user is instantiated on a User Plane Node (UPN). Each user plane node is capable of running one or more types of SF, and is capable of hosting many instances of SFs for many users. User plane nodes may have connections to other user plane nodes, to Radio Access Networks (RANs) consisting of Radio Base Stations (RBSs), and to Data Networks (DNs), e.g. operator services, Internet access or 3rd party services.

The service of a user may be expressed in terms of SFs (that is, which SFs does this service consist of) and constraints on SFs. Constraints may include: ordering relations between SFs (for example, packets for this user should pass the "bandwidth limiting" SF before they pass the "charging counter" SF); latency constraints (for example, the transport delay between the user plane node hosting this SF instance and a certain RBS should not exceed a certain time); topology constraints (for example, this SF should be instantiated on a user plane node that has a connection to a certain DN); etc.

A user may be a mobile device (UE) attached to an RBS. The UE has a position expressed as an identity of the RBS. Examples of UEs include mobile phones and IoT devices. A user may also be a device with multiple UEs, or a fixed device like a CPE (Customer Premise Equipment).

The group of SFs in a user service may be initiated on one or more user plane nodes. Exactly where to instantiate each SF instance depends on the constraints in the description of the service, on the topology of the network of user plane nodes, the capabilities of these user plane nodes, and the current position of the UE. The process of deciding where to instantiate each SF in a service description is referred to as the process of "placement".

The placement algorithm gets very complex when the topology is large or when there are many constraints. Furthermore, the service for a user may change over time, the user may change position over time, and even the topology may change over time. Upon every change, the placement algorithm needs to re-run to find the best placement given the new conditions. The placement decision should also be done fast, in the order of milliseconds, to avoid a deteriorated user experience. Another challenge is related to the resource consumption of the user plane nodes, for example, how many SFs can be instantiated on a user plane node without violating service-level agreements (SLAs). With these criteria, it is difficult to perform an optimal placement.

SUMMARY

According to a first aspect of the present disclosure, there is provided a method of reinforcement learning for placement of a plurality of service functions at nodes of a telecommunications network, the method comprising:
  defining a state of the system by means of an allocation matrix, wherein:
    each first vector of the allocation matrix corresponds to a respective one of the nodes of the telecommunications network,
    each second vector of the allocation matrix corresponds to a respective one of the plurality of service functions, and
    each cell of the allocation matrix contains a value 1 if the one of the plurality of service functions corresponding to the respective second vector is placed on the one of the nodes of the telecommunications network corresponding to the respective first vector, and otherwise contains a value 0.

The method may comprise further defining the state of the system by means of at least one additional matrix, wherein the or each additional matrix contains information specific to a family of service sets that share the same requirements.

The method may comprise further defining the state of the system by means of a service function type matrix, wherein:
  each first vector of the service function type matrix corresponds to a respective type of service function,
  each second vector of the service function type matrix corresponds to a respective one of the plurality of service functions, and
  each cell of the service function type matrix contains a value 1 if the one of the plurality of service functions corresponding to the respective second vector comprises a service function of the type corresponding to the respective first vector, and otherwise contains a value 0.

The method may comprise further defining the state of the system by means of a key performance indicator matrix, wherein:
  each first vector of the key performance indicator matrix corresponds to a respective type of key performance indicator,
  each second vector of the key performance indicator matrix corresponds to a respective one of the nodes of the telecommunications network, and
  each cell of the key performance indicator matrix contains a value indicating a value of the corresponding key performance indicator for the corresponding one of the nodes of the telecommunications network.

The method may comprise further defining the state of the system by means of an ordering matrix, wherein:
  each first vector of the ordering matrix corresponds to a respective one of the plurality of service functions,
  each second vector of the ordering matrix also corresponds to a respective one of the plurality of service functions, and
  each cell of the ordering matrix contains a value 1 if the one of the plurality of service functions corresponding to the respective first vector should be traversed by data passing through the plurality of service functions before the one of the plurality of service functions corresponding to the respective second vector, and otherwise contains a value 0.

The method may comprise further defining the state of the system by means of a latency constraint matrix, wherein:
  each first vector of the latency goal matrix corresponds to a respective one of the plurality of service functions,
  each second vector of the latency goal matrix also corresponds to a respective latency value, and
  each cell of the latency goal matrix contains a value 1 if the one of the plurality of service functions corresponding to the respective first vector has a latency requirement corresponding to the latency value of the respective second vector, and otherwise contains a value 0.

The method may comprise further defining the state of the system by means of at least one goal matrix, wherein the at least one goal matrix contains information specific to a subset of a family of service sets.

The method may comprise further defining the state of the system by means of a latency goal matrix, wherein:
  each first vector of the latency goal matrix corresponds to a respective one of the plurality of service functions,
  each second vector of the latency goal matrix also corresponds to a respective latency value, and
  each cell of the latency goal matrix contains a value 1 if the one of the plurality of service functions corresponding to the respective first vector has a latency requirement corresponding to the latency value of the respective second vector, and otherwise contains a value 0.

The method may comprise further defining the state of the system by means of a co-location goal matrix, wherein:
  each first vector of the co-location goal matrix corresponds to a respective one of the plurality of service functions,
  each second vector of the co-location goal matrix also corresponds to a respective one of the plurality of service functions, and
  each cell of the co-location goal matrix contains a value 1 if the one of the plurality of service functions corresponding to the respective row should be co-located with the one of the plurality of service functions corresponding to the respective second vector, and otherwise contains a value 0.

According to a second aspect, there is provided a method of reinforcement learning for placement of a plurality of service functions at nodes of a telecommunications network, the method comprising:
  determining a plurality of possible goal matrices;
  running a reward calculator for each of the possible goal matrices, to calculate a respective reward value for each of the possible goal matrices;
  selecting one of the calculated reward values; and
  outputting the selected one of the calculated reward values and the corresponding one of the possible goal matrices as a virtual reward and a virtual goal matrix for use in the reinforcement learning.

The step of selecting one of the calculated reward values may comprise selecting a largest reward value of the calculated reward values.

The method may comprise performing the steps of running the reward calculator for each of the possible goal matrices, selecting one of the calculated reward values, and outputting the selected one of the calculated reward values as a virtual reward and a virtual goal matrix only in response to determining that a cost of running the reward calculator is below a threshold and/or that a dimension of each goal matrix is below a threshold.

According to a further aspect, there is provided a computer program comprising instructions which, when executed on at least one processor, cause the at least one processor to carry out a method according to the first or second aspect.

According to a further aspect, there is provided a carrier containing a computer program according to the previous aspect, wherein the carrier comprises one of an electronic signal, optical signal, radio signal or computer readable storage medium.

According to a further aspect, there is provided a computer program product comprising non transitory computer readable media having stored thereon a computer program according to the previous aspect.

According to a further aspect, there is provided an apparatus for performing a method of reinforcement learning for placement of a plurality of service functions at nodes of a telecommunications network, the apparatus comprising a processor and a memory, the memory containing instructions executable by the processor such that the apparatus is operable to:
  define a state of the system by means of an allocation matrix, wherein:
    each first vector of the allocation matrix corresponds to a respective one of the nodes of the telecommunications network,
    each second vector of the allocation matrix corresponds to a respective one of the plurality of service functions, and
    each cell of the allocation matrix contains a value 1 if the one of the plurality of service functions corresponding to the respective second vector is placed on the one of the nodes of the telecommunications network corresponding to the respective first vector, and otherwise contains a value 0.

According to a further aspect, there is provided an apparatus for performing a method of reinforcement learning for placement of a plurality of service functions at nodes of a telecommunications network, the apparatus comprising a processor and a memory, the memory containing instructions executable by the processor such that the apparatus is operable to:
  determine a plurality of possible goal matrices;
  run a reward calculator for each of the possible goal matrices, to calculate a respective reward value for each of the possible goal matrices;
  select one of the calculated reward values; and
  output the selected one of the calculated reward values and the corresponding one of the possible goal matrices as a virtual reward and a virtual goal matrix for use in the reinforcement learning.

DETAILED DESCRIPTION

In the Evolved Packet Core (EPC) network defined by 3GPP, the architecture consists of large monolithic functional entities, such as the Mobility Management Entity (MME) and the Policy and Charging Rules Function (PCRF).

By contrast, in the 5th Generation core (5GC) network, some of these large monolithic functional entities are split up into smaller network functions.

Figure 1:
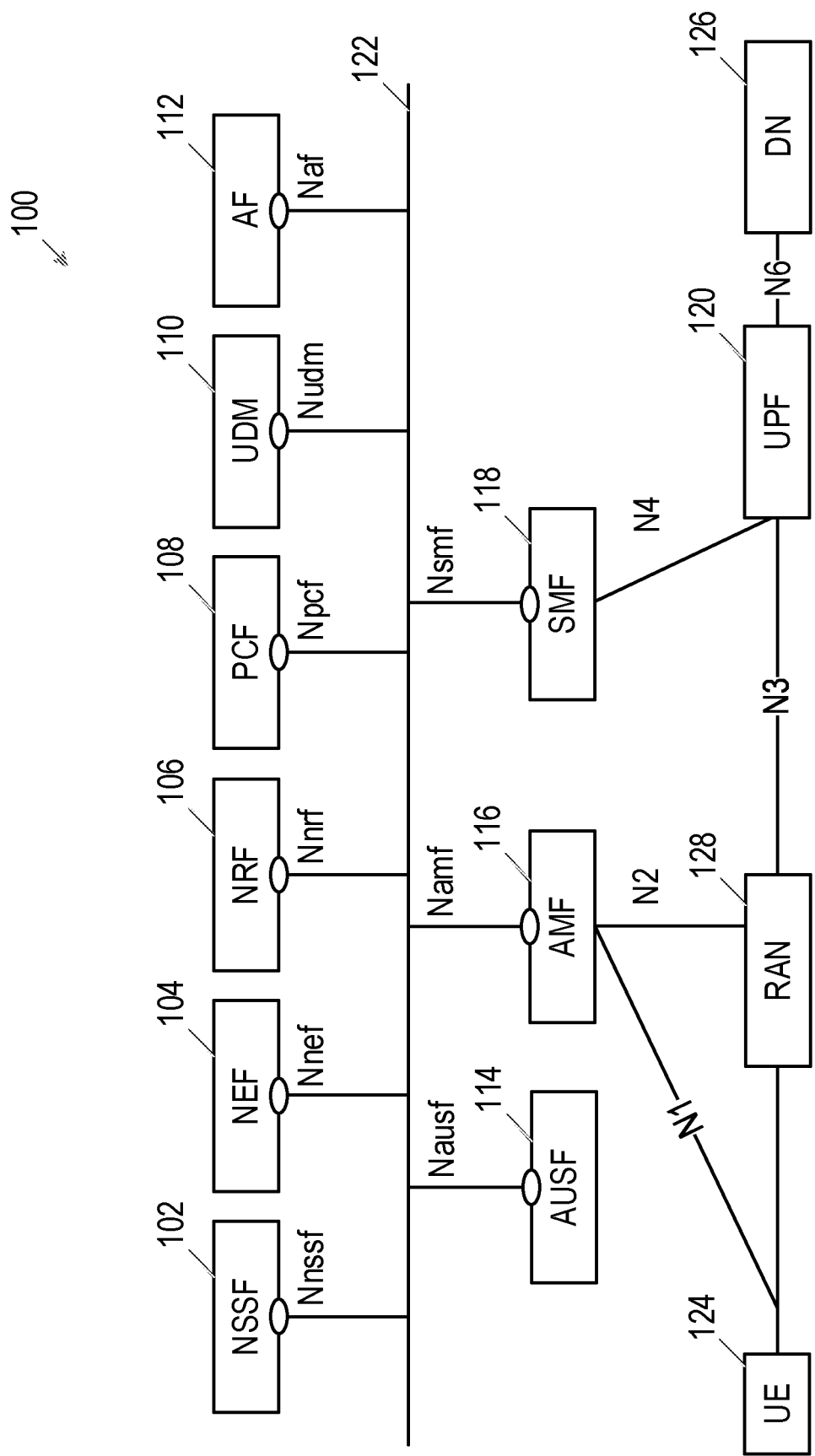
FIG. 1 is a schematic diagram of a network architecture.

FIG. 1 shows a 5th Generation core (5GC) network architecture 100.

Specifically, FIG. 1 shows the relevant parts of the network architecture 100 comprising: a Network Slice Selection Function (NSSF) 102, with a service-based interface Nnssf; a Network Exposure Function (NEF) 104, with a service-based interface Nnef; a Network Repository Function (NRF) 106, with a service-based interface Nnrf; a Policy Control Function (PCF) 108, with a service-based interface Npcf; a Unified Data Management (UDM) function 110, with a service-based interface Nudm; an Application Function (AF) 112, with a service-based interface Naf; an Authentication Server Function (AUSF) 114, with a service-based interface Nausf; an Access and Mobility Management Function (AMF) 116, with a service-based interface Namf; a Session Management Function (SMF) 118, with a service-based interface Nsmf; and a User Plane Function (UPF) 120, with an N4 reference point between the UPF and the SMF.

As described in more detail below, the User Plane function (UPF) 120 supports handling of user plane traffic, including packet inspection, packet routing and forwarding (including traffic steering), traffic usage reporting, and Quality of Service (QoS) handling for the user plane (for example Uplink and/or Downlink rate enforcement).

The network functions are connected to each other via a logical communication bus 122.

A User Equipment (UE) device 124 establishes a connection to a Data Network (DN) 126 through a Radio Access Network 128, and through the User Plane function (UPF) 120.

Figure 2:
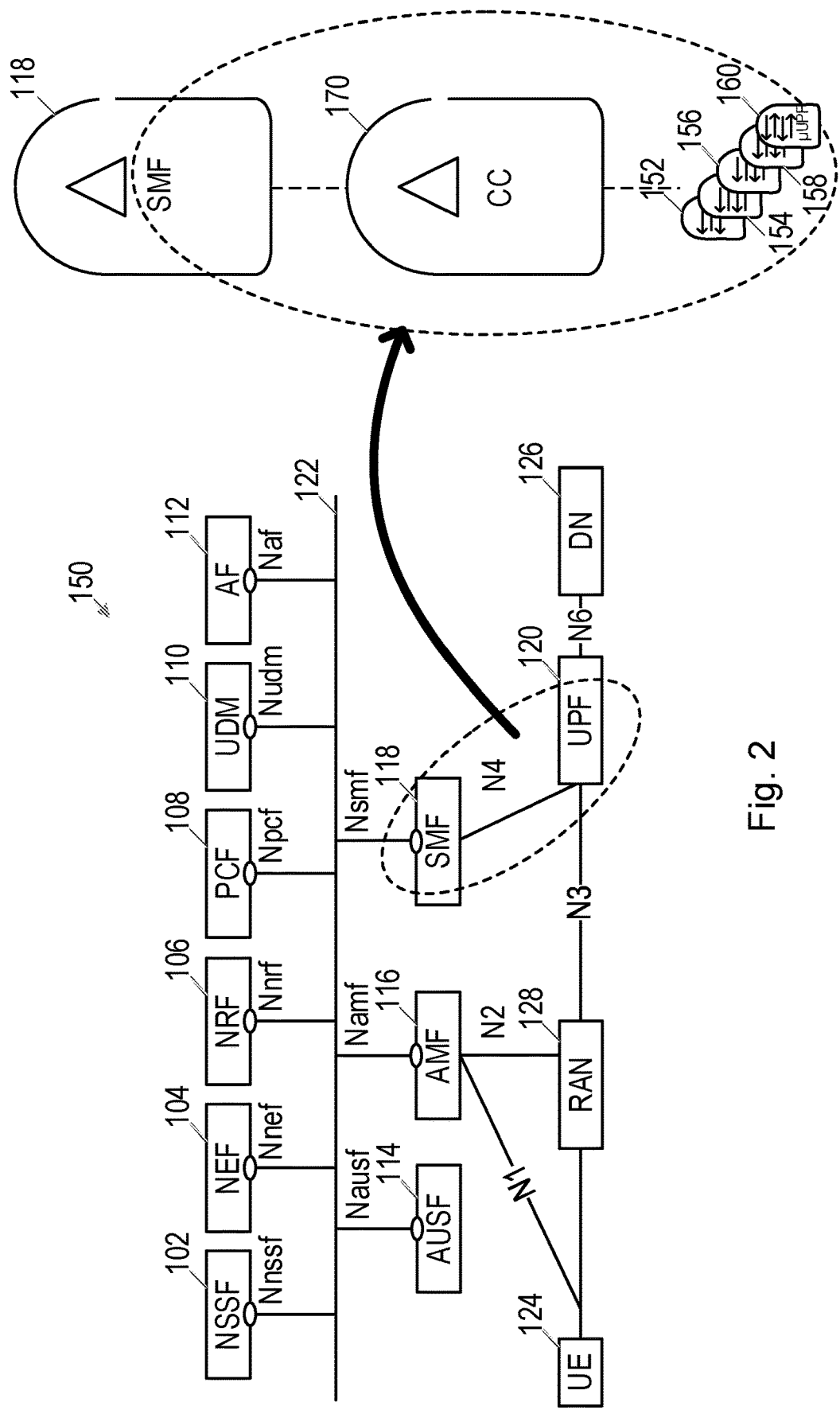
FIG. 2 is a schematic diagram of an alternative network architecture.

FIG. 2 illustrates a development 150 of the architecture shown in FIG. 1.

Specifically, FIG. 2 shows the replacement of the single UPF 120 by multiple small service functions, which may also be referred to as micro UPFs (pUPF) 152, 154, 156, 158, 160.

This replacement provides improved flexibility to support diverse use cases, and allows new services to be introduced more quickly. The set of SFs can then be recomposed into a service chain for a user.

Although the replacement of the single UPF 120 by multiple small service functions is shown here, and described in more detail below, the same form of decomposition into service functions can equally be applied to SGi/N6 functions in the core network, to parts of a virtual radio access network, and to fixed network components such as a virtual Broadband Network Gateway (vBNG).

The service functions (SFs) are hosted on user plane nodes. A single service chain for a given user may then span across multiple user plane nodes, for example with some SFs located in a central site, while some SFs are located in the local site for the given user.

A chain controller (CC) 170 is located logically between the SMF 118 and the micro UPFs 152, 154, 156, 158, 160. In practice, the chain controller (CC) 170 may be a part of the SMF 118.

Figure 3:
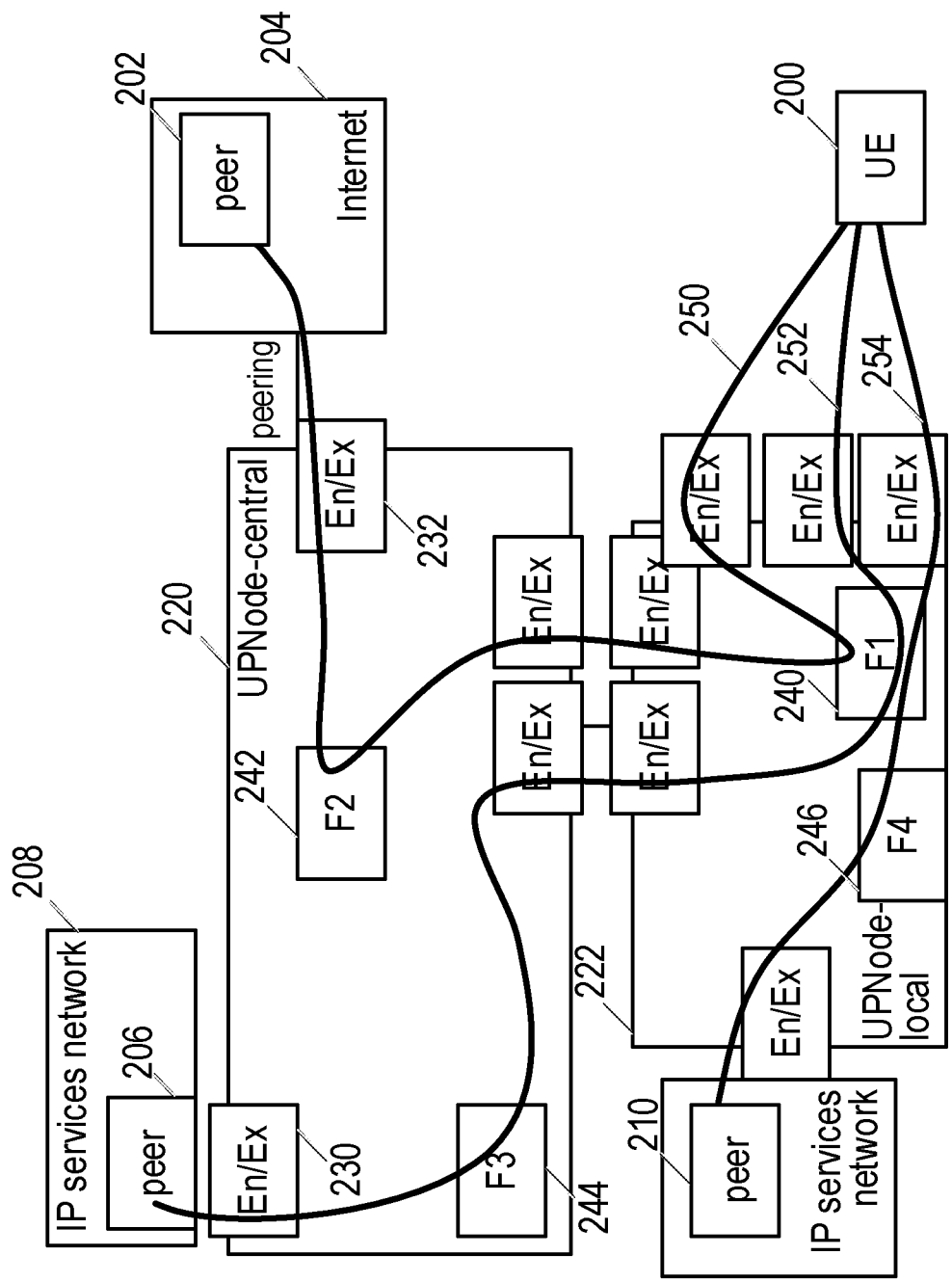
FIG. 3 illustrates the placement of service functions on network nodes.

FIG. 3 illustrates a simple example of chaining services for one particular user. Specifically, FIG. 3 shows a UE 200, which has access to three services, namely communicating with a first peer 202 on the Internet 204; communicating with a second peer in the form of a centralized server 206, for example a content delivery network (CDN) server, over an IP services network 208; and communicating with a third peer in the form of a localized server 210.

In the illustrated example, there are two user plane nodes (UP-Node), namely a central node 220 and a local node 222.

Each of the nodes is provided with entry and exit SFs (En/Ex) 230, 232, . . . etc". Any traffic entering a node must pass through an entry SF, which typically performs demultiplexing and decapsulation, while any traffic leaving a node must pass through an exit SF, which typically perform encapsulations of the packets.

All the traffic from the UE 200 has to pass the first SF (F1) 240, while traffic for the peer 202 must additionally pass through a second SF (SF2) 242, traffic for the centralized server 206 must pass through a third SF (SF3) 244, and traffic for the localized server 210 must pass through a fourth SF (SF4) 246.

FIG. 3 then shows the chaining via multiple user plane nodes. A chain 250 connects the UE 200 to the peer 202 through F1 240 and F2 242 and through suitable En/Ex SFs. Similarly, a chain 252 connects the UE 200 to the centralized server 206 through F1 240 and SF3 244 and through suitable En/Ex SFs. A chain 254 connects the UE 200 to the local server 210 through F1 240 and SF4 246 and through suitable En/Ex SFs.

This is managed by the chain controller (CC) 170. The SMF (Session Management Function) 118 is the entity that requests a service for the user. It does so by providing the service description to the chain controller. The service description is a reference to one or more service templates, with parameters filled in. A service template is a collection of UPFs that realize a service or a part of a service.

Figure 4:
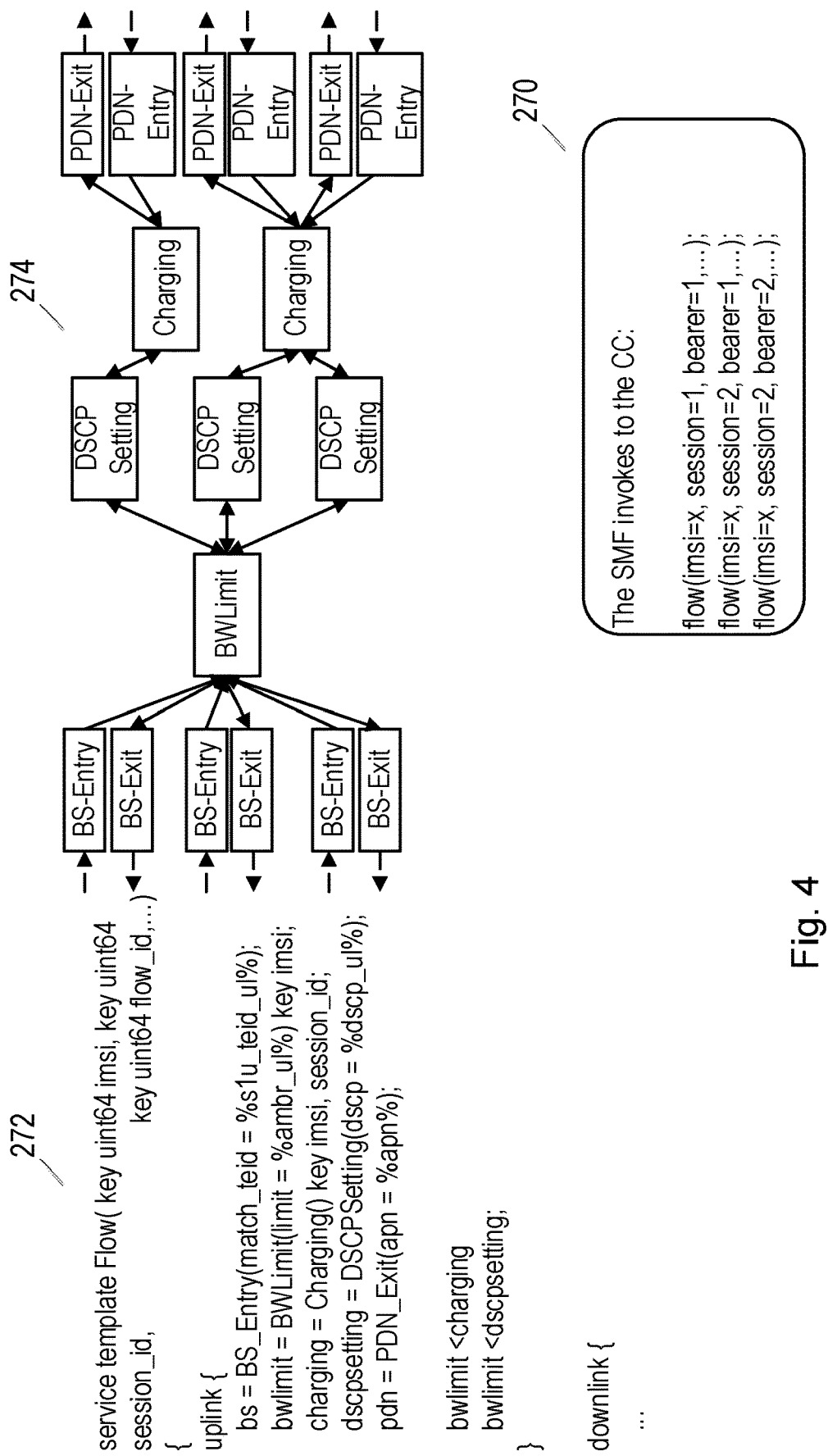
FIG. 4 illustrates a service flow.

By way of illustration only, one example of this is shown in more detail in FIG. 4, which shows the service description 270 consisting of three service templates called "flow". Each flow service template has different parameters. FIG. 4 also shows the definition 272 of the service template "flow", which consists of a description of the SFs/pUPFs used to set up a flow, including parameters for the SFs and constraints (e.g. the bandwidth limit SF comes before the charging SF in the uplink).

FIG. 4 also includes a graphical representation of the service chain graph 274, that is, a graphical representation of the service description and the service templates referred to in the service description. These elements therefore describe what user plane service functions are required for the user.

The chain controller's overall responsibility is to make sure that the requested service is instantiated for the user in the user plane nodes. On a high-level, it does its task by identifying which SFs are needed for the requested service, in which order the user plane packets should traverse through the SFs and on which user plane nodes the identified SFs should be executed for the given user.

Figure 5:
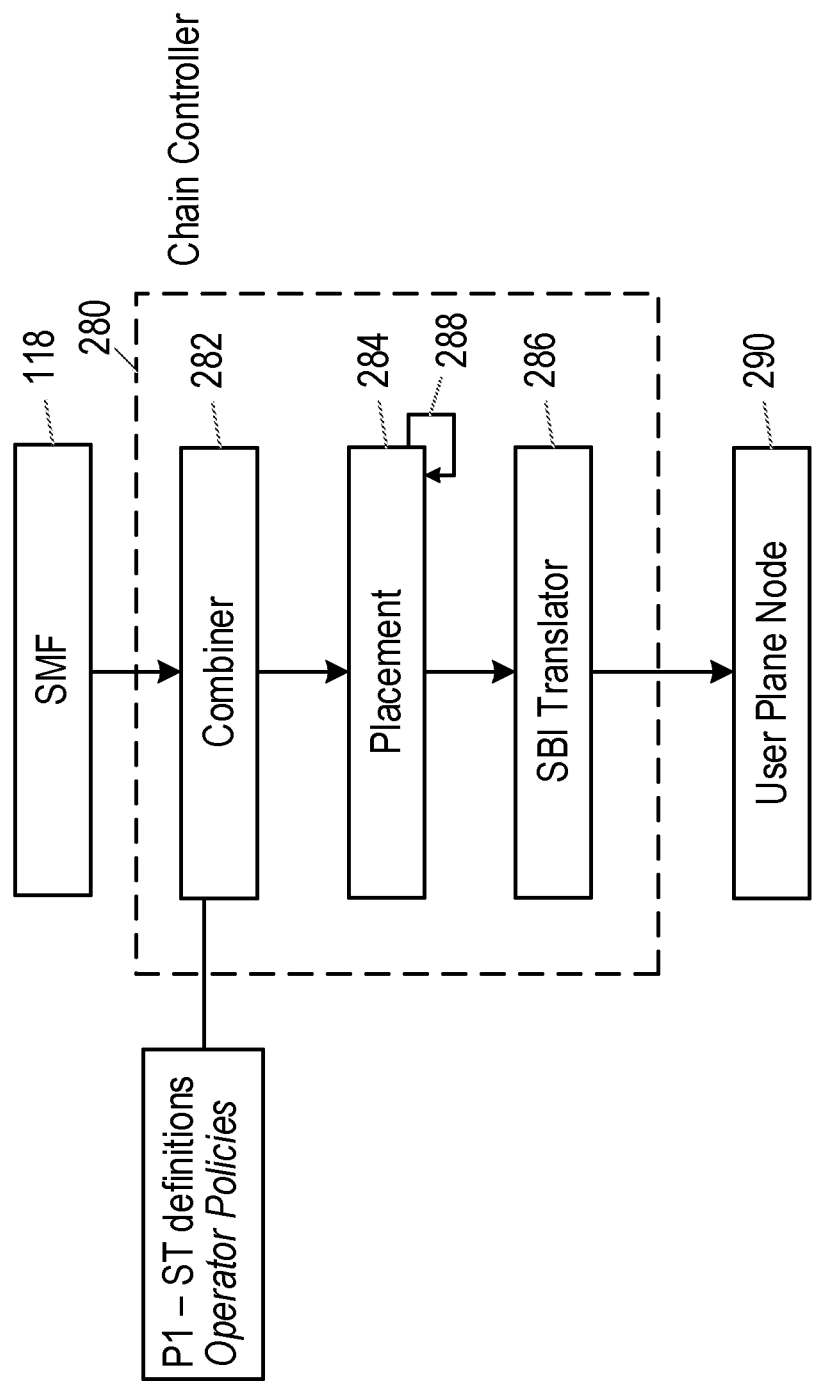
FIG. 5 illustrates operation of a chain controller.

FIG. 5 illustrates schematically the operation of the chain controller.

Specifically, as mentioned above, the SMF (Session Management Function) 118 provides a service description to the chain controller 280, which consists of multiple modules, namely a Combiner 282, Placement module 284, and SBI (Southbound-interface) Translator 286.

The Combiner module 282 operates to retrieve the definitions of the service templates (ST) over a P1 interface, and to retrieve the specific service templates that are referred to in the service description provided by the SMF 118, and to determine the SFs that will be used to realize the service. This collection of SFs is called the service set. The service set is sent to the Placement module 284.

The Placement module 284 decides which SFs will be run on which user plane nodes. If needed, it splits the service set into multiple service subsets, and sends the appropriate service subsets to the appropriate Placement modules 284, and ultimately SBI translator modules 286, responsible for the given user plane node. As shown by the arrow 288, the placement process can be an iterative one. For example, there may be a hierarchy of placement modules, with one placement module acting over an entire country, and talking to regional placement modules, which in turn talk to edge site placement modules.

The SBI translator 286 is responsible for installing the forwarding rules to the user plane node 290, by translating between the service (sub)-set and the protocol used to control the user plane node (referred to as the CP-UP protocol).

The chain controller 280 also has the responsibility to allocate identity objects to the user, if such objects are defined in the service template. For example, an IPv4 address or IPv6 prefix, or a tunnel endpoint identifier (TEID) which will be used to demultiplex the uplink traffic and identify the right user, in if GPRS Tunneling Protocol-User Plane (GTP-U) is used between the Base Station and the User Plane Nodes. Objects such as the address/prefix and TEID are typically associated with the user plane node that runs the user plane for the specific user.

A single service may span multiple user plane nodes. For example, as shown in FIG. 4, the connection from the UE 200 to the peer 202 goes across the nodes 22 and 220. If that is the case, encapsulation may be used between the user plane nodes. If the protocol is GTP-U, a TEID must be allocated in both user plane nodes, which must be used by the sending entity when encapsulating the packets, so that the receiving end can correctly identify the user.

Figure 6:
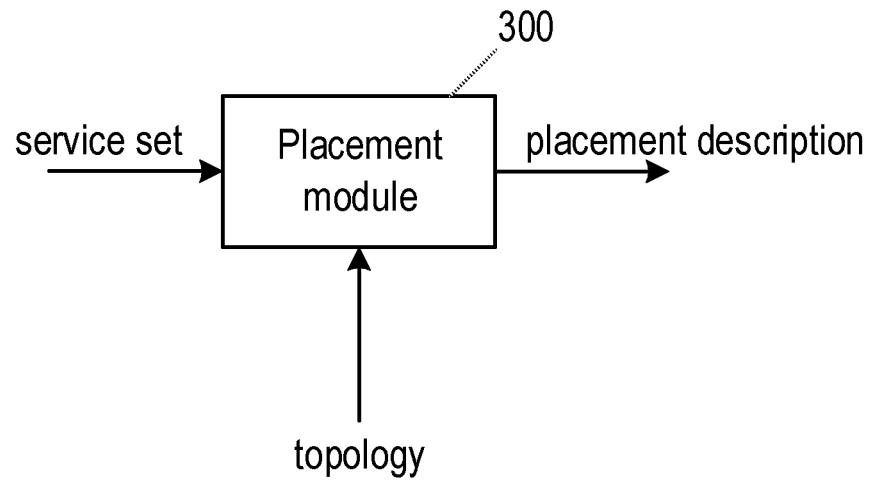
FIG. 6 illustrates operation of a method of placement.

The disclosure herein relates primarily to the placement process, which is illustrated schematically in FIG. 6.

Thus, the service set described above is input to the placement module 300. The service set consists of a list of SFs and constraints on SFs. The placement module 300 also receives a description of the topology of user plane nodes. The placement module 300 then outputs a placement description, which contains the list of SFs from the service set, where each SF is now associated with an identity of the node that it is to be instantiated on.

The service set and the topology are described in more detail below.

The service set is a list of SF instances, where each SF instance has several information elements, for example:

A unique identity.

Type—Describes the required function; e.g. bandwidth limiter, counter, tunnel encapsulation/decapsulation, classifier, etc.

Role—Whether the SF instance at the beginning of the chain (entry), at the end of the chain (exit), or in between (normal).

Direction—Uplink or downlink.

Context—An SF instance may have a piece of memory associated in which it can store internal variables, and the context is a pointer to such memory. Note that multiple SF instances of the same service set may use the same context.

Parameters—When invoking an SF, one or more parameters may be passed.

Number of ports—Some SFs may have multiple output ports. For example, a classifier SF may get IP packets as input, and send HTTP IP packets on its first output port and non-HTTP IP packets on its second output port.

One or more flow descriptors—A flow is a concept used in chaining and defines which packets shall be routed through this SF instance. For example, a flow descriptor may say "route all packets through this SF that were emitted by entry SF X, and by output port Y of SF Z". In general, a flow description consists of the identify of one entry SF and the identify and output port of one or more normal SFs.

One or more assign object pointers, where an assign object is a variable set by the system that may be used by the SF instance. An example is an IP address of a session. Multiple SF instances of the same service set may use the same assign object.

Latency—An SF instance may be associated with a maximum transport latency to the Radio Access Network.

One or more co-locations—An SF instance may need to be co-located on the same user plane node as another SF instance of the same service set. Co-location constraints may be implicit (for example when two SF instances are using the same context). The co-location information element allows an explicit constraint to be set. This can for example be used to avoid unnecessary packet routing loops between two user plane nodes.

Network ID—An SF instance of role entry or exit needs to be associated with the network outside the chain; that is, where the packets come from or shall be forwarded to. This may be a radio access network (or, more precisely, a radio base station), or a data network (e.g. "Internet").

In addition to the list of SF instances, the service set also contains a list of chain ordering constraints. Each ordering constraint is a pair of SF instance identities, where (A, B) denotes that packets shall first be routed through instance A before they are routed through instance B.

The topology data is a list of user plane nodes. Each node has several information elements, for example:

A unique identity or name

The cost to run a service function on this node.

A list of service type capabilities; that is, the types of service functions of that can be instantiated on this node.

For each service function type in the list above, optionally a list of network IDs associated with this service function. This is only valid for service functions of role entry or exit.

A list of connections to other user plane nodes. Each connection has a transport latency.

The placement algorithm is therefore complex to design using traditional programming techniques.

As described herein, therefore, the placement of the service functions at the nodes is performed by a method of reinforcement learning. Using reinforcement-learning for placement allows the system to learn by itself, for every specific network and set of UEs. Although the following description relates specifically to service chaining of a de-composed user plane, the same ideas presented below apply equally to a user plane that is not de-composed, for example, for EPC with SGW/PGW services on SGi or 5GC with multiple UPFs and services on N6, where the services can be treated in the same way as the service functions in this detailed description.

Figure 7:
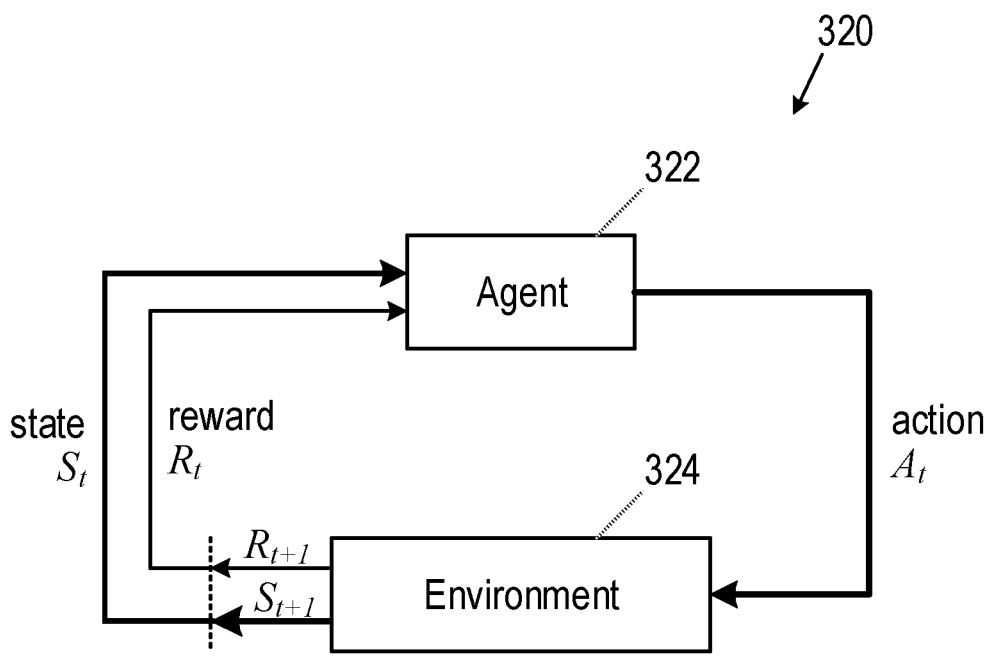
FIG. 7 illustrates a method of reinforcement learning.

FIG. 7 is a schematic diagram illustrating a model 320 for Reinforcement Learning (RL), which is composed of an agent 322 and an environment 324 which interact through state, action and reward metrics. At each time step t, given a state $S_t$, the agent 322 takes an action $A_t$ in the environment 324. Given $S_t$ and $A_t$, the environment 324 generates the next state $S_{t+1}$, and a reward $R_t$. The agent 322 updates its policy by using the feedback $R_t$ and $S_{t+1}$, from the environment 324.

Figure 8:
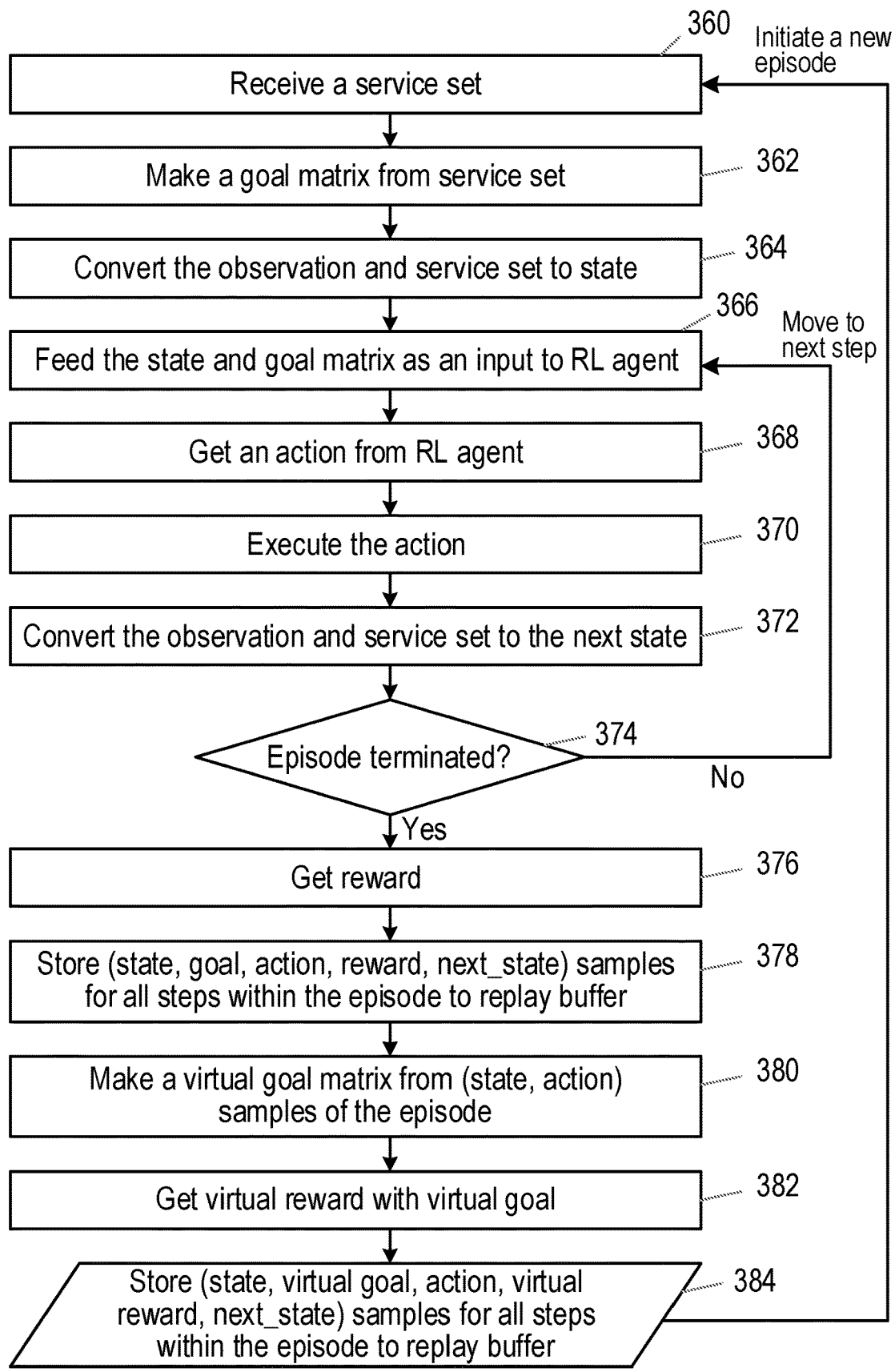
FIG. 8 illustrates a method of placement in accordance with the present disclosure.

FIG. 8 is a flow chart, illustrating a method of placement of a plurality of service functions at nodes of the network, and specifically to a method for building an RL training framework for the placement of service functions. Once trained, the RL agent can be used in a running system as a placement algorithm.

The procedure in the flow chart starts at step 360 with receiving a service set request containing all the information on the SFs. Given that service set, a goal matrix and state is composed at step 362 and fed into the RL agent.

At step 364, observations from the environment, and the service set, are converted to a state of the system. In general, an observation is a piece of information that is not available in the service set, such as information on the topology of user plane nodes, or some condition of the user plane nodes such as the load.

At step 366, a goal matrix is fed into the agent as an additional input to the state. The goal matrix can be seen as a hint to the agent on how to achieve its placement task.

At step 368, the RL agent model outputs an action, which is a placement of one of the SFs on a user plane node. Execution of this action in step 370 means that the next state is updated, as described in more detail below.

After execution of the placement, new observations may be made and converted to a new state (i.e. the next state) in step 372.

It is then determined in step 374 whether the episode is terminated (that is, whether all SFs have been placed). If they have not, the process returns to step 360 for the placement of the next SF.

When all SFs have been placed, and the episode is done, the process passes to step 376, and the reward is obtained from the reward calculator. This is described in more detail below. Then, in step 378, the reward together with the state, goal and action are stored in a replay buffer as (state, goal, action, reward, next_state) samples for this episode. The replay buffer is a storage of training samples, which are used for updating the agent model.

A reward indicates how good (or how bad) a given placement of the SFs in the service set is. Especially during the beginning of the training phase, it may be difficult for the agent to achieve goods rewards. The consequence of this is that training takes a long time. One way to improve this is to use a so-called virtual goal. With a virtual goal we take a given placement and adjust the goal matrix such that we enforce that the reward becomes good. In other words, we tell the agent "the placement you produced would have been good, if the goal was this-and-this". This development of Reinforcement Learning is known as "Hindsight Experience Reply (HER)", and is described in "Hindsight Experience Replay", Marcin Andrychowicz, Filip Wolski, Alex Ray, Jonas Schneider, Rachel Fong, Peter Welinder, Bob McGrew, Josh Tobin, Pieter Abbeel, Wojciech Zaremba, arXiv:1707.01495.

Returning to FIG. 8, in step 380, a virtual goal matrix is generated from (state, action) samples of the episode. Thus, in step 382, the virtual goal generator generates a virtual goal from a (state, action) pair sample, and the reward calculator computes the corresponding virtual reward from the virtual goal. In step 384, the (state, virtual goal, action, virtual reward, next_state) samples for this episode are stored in a replay buffer. When all possible virtual goals have been used, one specific virtual goal and corresponding virtual reward are selected.

Figure 9:
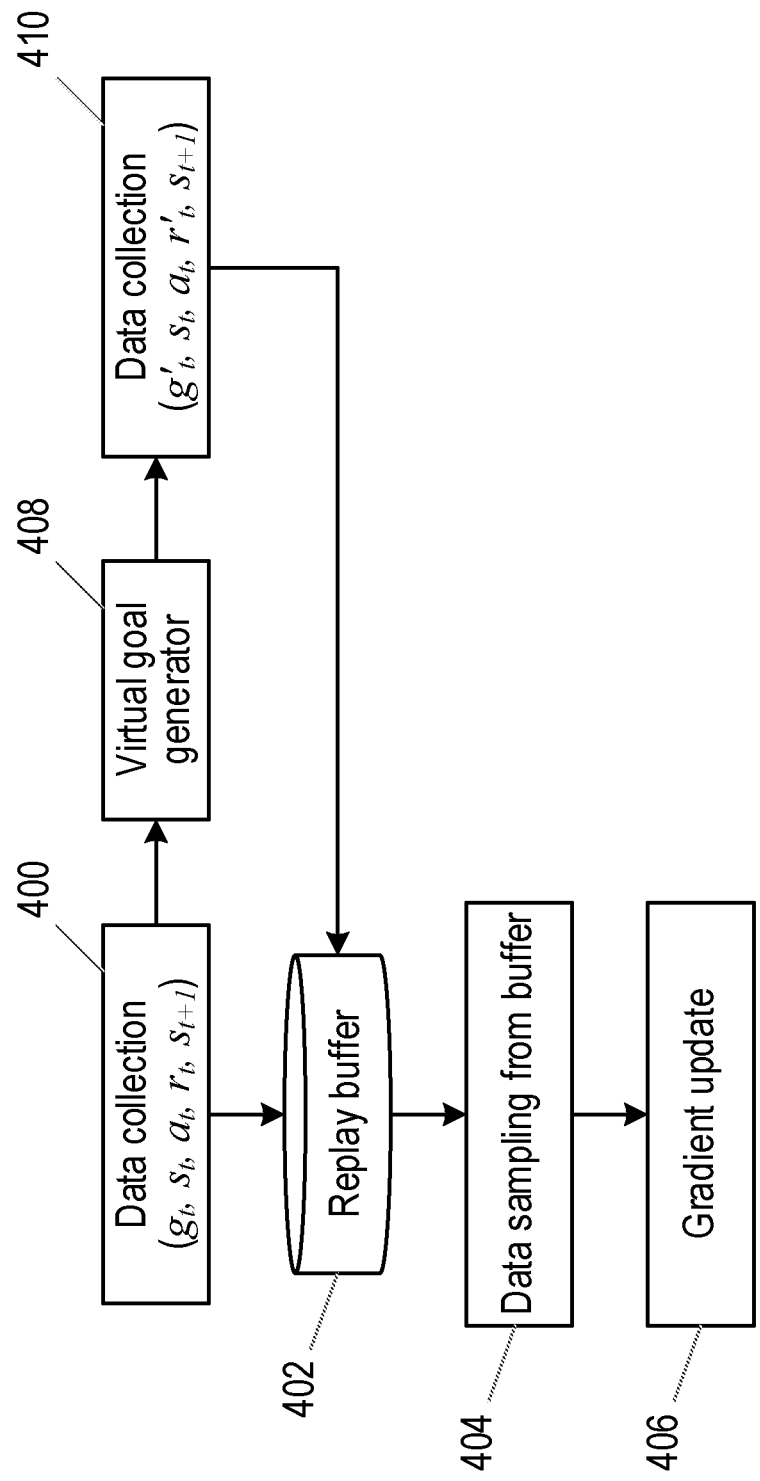
FIG. 9 illustrates a system for performing the method of FIG. 8.

FIG. 9 is a schematic diagram illustrating a system for performing the method.

As described above, data consisting of samples of the state ($s_t$), goal ($g_t$), action ($a_t$), reward ($r_t$), and next state ($s_{t+1}$) are collected at 400, and stored in the replay buffer 402.

The agent is equipped with a neural network whose parameters are updated by stochastic gradient decent. To compute the gradient, data samples in replay buffer are picked at 404, and used for computing the gradient at 406, based on a loss function that depends on training algorithms.

In addition to storing the experienced state, goal, action, and reward samples, the training samples are augmented by generating virtual goals at 408, and collecting virtual samples at 410, where the virtual samples consist of the state ($s_t$), virtual goal ($g'_t$), action ($a_t$), virtual reward ($r'_t$), and next state ($s_{t+1}$).

In many cases, the virtual reward is more informative than the non-virtual reward. This therefore has the advantage that the training data is augmented, and so the training becomes faster and more scalable, which is advantageous when the network topology is bigger and more complex.

One aspect of the method of FIG. 8 is the way in which the service set and environment observations are converted to a number of structured matrices which can be understood by the agent for training and execution.

Specifically, one or more of these matrices use a one-hot encoder, that is, they present the information on the form of a series of data values, where only one of the data values is a 1, and the other data values are 0.

This is illustrated with reference to FIG. 10, which shows a very small-scale example of a telecommunications network, consisting of three sites, referred to as Malmö 420, Kalmar 422, and Lund 424, at which network nodes are located. Each of these sites has a respective collection of UPF SFs 430, 432, 434, which is connected to a respective radio access network 440, 442, 444. In addition, the UPF service functions 430 at the Malmö site 420 are connected to a data network 446, and to control plane functionality 448.

Figure 10:
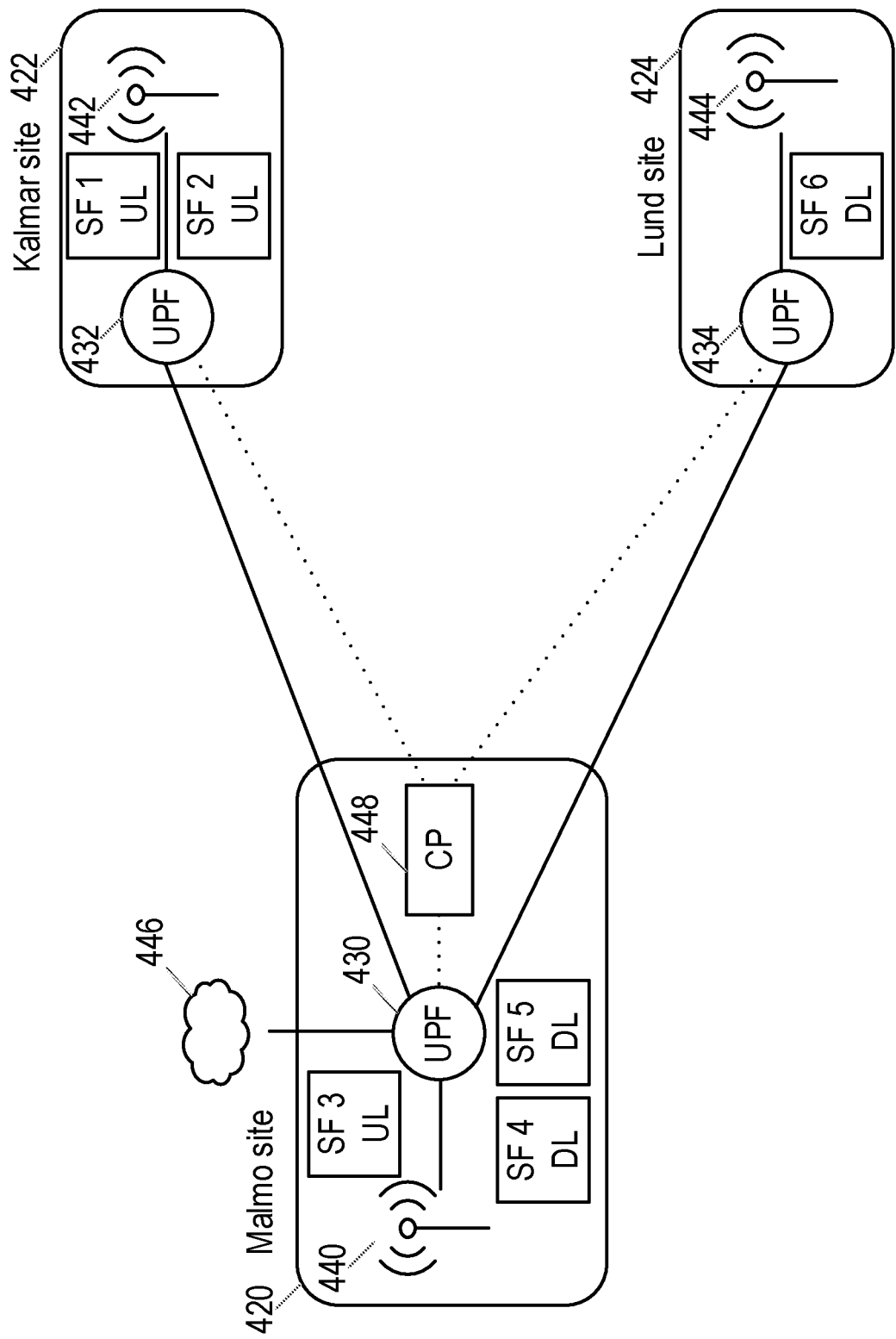
FIG. 10 illustrates the operation of the method of FIG. 8.

FIG. 10 also shows the placement of the various service functions SF1, SF2, SF3, SF4, SF5 and SF6 at the three sites, for one specific user, with the service functions SF3, SF4, and SF5 at the Malmö site 420, service functions SF1, and SF2 at the Kalmar site 422, and service function SF6 at the Lund site 424.

Thus, the state of the system, in its most basic form, consists of a single placement matrix, or allocation matrix.

In this allocation matrix, each row corresponds to a particular user plane node, and each column corresponds to a respective one of the plurality of service functions, and each cell of the matrix contains a value 1 if the one of the plurality of service functions corresponding to the respective column is placed on the one of the nodes of the telecommunications network corresponding to the respective row, and otherwise contains a value 0. Thus, each column contains a one-hot encoded value, representing the fact that the corresponding service function is placed at one of the network nodes.

|  | SF1 | SF2 | SF3 | SF4 | SF5 | SF6 |
|---|---|---|---|---|---|---|
| Malmö | 0 | 0 | 1 | 1 | 1 | 0 |
| Kalmar | 1 | 1 | 0 | 0 | 0 | 0 |
| Lund | 0 | 0 | 0 | 0 | 0 | 1 |

It is this allocation matrix that is updated after each set in the episode, thereby updating the state. That is, in the method of FIG. 8, each iteration of steps 366-374 places one of the service functions on a particular node, and thus fills in one column of the allocation matrix, until every service function has been placed, and so every column is filled, and the episode is terminated in step 374.

Incidentally, although the allocation matrix is presented here with each row corresponding to a particular user plane node, and each column corresponding to a respective one of the plurality of service functions, it will be apparent that the matrix could equally be transposed, with each column corresponding to a particular user plane node, and each row corresponding to a respective one of the plurality of service functions. In more general terms, it can be said that the allocation matrix is made up of multiple vectors, where each first vector corresponds to a particular user plane node, and each second vector corresponds to a respective one of the plurality of service functions. Then, the first vectors can be either rows or columns, and the second vectors can be either columns or rows, as the case may be. This discussion applies, with appropriate changes to the data being represented, to each of the matrices discussed herein.

Additional matrices can be added to the state.

One example of such an additional matrix is a service function type matrix. On the left below is a table listing six service functions SF1, SF2, SF3, SF4, SF5 and SF6, which may be required by users, and which are of types: tunnel header decapsulation (SF1), bandwidth limiting (SF2 and SF5), data network exit (SF3), data network entry (SF4), and tunnel header decapsulation (SF1). The data presented in the table can be converted into a matrix, as shown on the right below, where each row of the service function type matrix corresponds to a respective type of service function, each column of the service function type matrix corresponds to a respective one of the plurality of

|  | Type |
|---|---|
| SF 1 | Tunnel header decapsulation |
| SF 2 | Bandwidth limit |

|  | Type |
|---|---|
| SF 3 | Data network exit |
| SF 4 | Data network entry |
| SF 5 | Bandwidth limit |
| SF 6 | Tunnel header encapsulation |

|  | SF 1 | SF 2 | ... | SF 6 |
|---|---|---|---|---|
| Decaps | 1 | 0 | ... | 0 |
| Bw-limit | 0 | 1 | ... | 0 |
| Dn exit | 0 | 0 | ... | 0 |
| Dn entry | 0 | 0 | ... | 0 |
| Encaps | 0 | 0 | ... | 1 |

Thus, as with the previous example matrix, each column contains a one-hot encoded value, representing the fact that the corresponding service function is of one specific type. The service function type matrix for a user therefore indicates the types of service function that are required by that user for a particular service, and allows the system to distinguish between users that require different types of service function. A family is a collection of service sets that all share the same requirements. These requirements are captured in the additional matrices.

Another example of an additional matrix is a node KPI (key performance indicator) matrix. In such a matrix each row of the matrix corresponds to a respective type of key performance indicator, each column of the matrix corresponds to a respective one of the nodes of the telecommunications network, and each cell of the matrix contains a value indicating a value of the corresponding key performance indicator for the corresponding one of the nodes of the telecommunications network.

Examples of types of KPI that could be represented are CPU utilization, the maximum number SFs in the nodes, or congestion.

A further example of an additional matrix is an order matrix that captures ordering constraints between SFs. In such an ordering matrix, both row and column are the SFs in the service set. Every cell is of value 0 or 1, where 1 indicates that the row's SFs should be traversed before the column's SF.

Thus, in an example where there are four service functions SF1, SF2, SF3, and SF4, the constraints that service function SF1 must be traversed before service function SF3, and service function SF4 must be traversed before service function SF2, are represented as follows:

|  | SF1 | SF2 | SF3 | SF4 |
|---|---|---|---|---|
| SF1 | 0 | 0 | 1 | 0 |
| SF2 | 0 | 0 | 0 | 0 |
| SF3 | 0 | 0 | 0 | 0 |
| SF4 | 0 | 1 | 0 | 0 |

A further example of additional matrix that can form part of the state description is a matrix capturing the latency constraints of SFs. In such a latency constraint matrix, rows correspond to a maximum latency, columns correspond to the SFs, and every cell value is 0 or 1, where 1 indicates that the latency corresponding to the row applies to the SF corresponding to the column. Otherwise the cell value is 0.

In general, additional matrices can hold any information from the service set or from the environment (observation) that can help the agent in the placement. The set of matrices is used for training an agent to be adaptive to various families of service sets. Within a family of service sets the content (rows, columns and cell values) of each additional matrix is static. The additional matrices that are provided, and/or the information that is contained in the additional matrices, mean that each family has a unique representation in the collection of additional matrices.

Without additional matrices it may be impossible for the agent to learn. For example, in the case of two service sets SF1-SF6 and SF7-SF12 that are identical, except that the first service set has an ordering constraint that "SF 1 comes before SF2" while the second service has the inverse constraint that "SF8 (which corresponds to SF2) comes before SF7 (which corresponds to SF7)". This constraint may, together with other constraints, mean that the optimal placement of the SFs in the first service set differs from the second service set. However, there is no way for the agent to tell the difference between the two service sets, unless information on this ordering constraint is added to the state.

The set of matrices used in the state needs to be formed such that the agent can distinguish between all service set families that need to be supported. Exactly which families need to be supported depends on the overall requirements on the system and its use cases. There may for example be one family for a voice service, one family for IoT devices, one family for low-latency communication with a certain local edge, etc.

Given all the matrices for all service set families, a single group of matrices is made for the agent. If a first family requires matrix A and B, and a second family requires matrix B and C, then the single group would consist of matrix A, B, and C. When training for the second family, the cell values of matrix A are simply left empty or set to 0. Similarly, if matrix B for the first family would contain x number of rows for a certain information element (for example, an SF), and matrix B for the second family would contain y number of rows of the same information element, then the matrix B in the single group would get the number of rows equal to the larger of x and y, and unused rows are simply left empty.

The allocation matrix in the state captures information about the ongoing placement in the episode, and the additional matrices in the state capture information to distinguish between service set families. A goal matrix is an additional input to the state as a hint to the agent that can help achieving its placement task. A goal matrix is composed from information in service set. The goal matrix cell values capture information unique to a certain service set (that is, to a member of a family). These values are static through the training episodes for this service set.

Thus, for example, in a situation where there are multiple users that require exactly the same service, these users can be regarded as members of the same family, where the family is defined by the additional matrices described above.

However, if there is some additional requirement (for example if the users are currently located in different parts of the country, and connecting to different base stations), the optimal user plane place placement for these users may be different, even though they have the same service functions. The service/family may have a specific latency constraint on the two SFs, and this implies that the optimal placements of the SFs on the user plane node(s) will be different for the users. Therefore, if the same placements are selected for the multiple users, then the calculated rewards for these users should be different. However, the agent needs additional information in order to distinguish between the users in this way. This information is provided in one or more goal matrices.

For example, one use case may be where the family of the service provides a service "Connection for an IoT electricity meter". In this illustrative example, there is a single goal matrix, relating to the radio access node accessed by a respective user. The table below shows the connection between the service functions SF1-SF6 and respective Network IDs, where the Network ID is an identification of the beginning or end of the service chain. Since a chain extends between a radio network and a data network, the network ID could be an identification of the data network, or an identification of the base station where the user currently is located. In this example, as shown in FIG. 10, there are three radio access networks 440, 442, 444 in Malmö, Kalmar and Lund, each containing multiple base stations.

The matrix below therefore shows the information from the table, in respect of SF1 and SF6.

|       | NetworkID   |        | SF1 | SF6 |
|-------|-------------|--------|-----|-----|
| SF 1  | " Kalmar"   | Malmö  | 0   | 0   |
| SF 2  | " "         | Kalmar | 1   | 0   |
| SF 3  | " Internet" | Lund   | 0   | 1   |
| SF 4  | " Internet" |        |     |     |
| SF 5  | " "         |        |     |     |
| SF 6  | " Lund"     |        |     |     |

In this example, each column has only a single cell set to "1". In a more generic approach, it may be possible that multiple cells in a column would be set to "1". For example, assume also SF3 would be an additional column of the matrix on the right above. When all three sites Malmö, Kalmar and Lund are capable of providing a connection to "Internet", then all cells in the SF3 column will be set to "1".

In this example, we have a single goal matrix. It would also be possible to have multiple goal matrices, each capturing different information elements.

Another example of an information element that may be used in the goal matrix is a latency matrix.

The path from the access network to the user plane node needs to match the latency requirement on the SF given in the service set. An example matrix below indicates the latency requirement for each service function. Thus, SF1, SF2, and SF3 each have a latency requirement of 100 ms, and SF4, SF5, and SF6 each have a latency requirement of 50 ms.

|                              | 10 ms | 50 ms | 100 ms | 150 ms | 200 ms | ... |
|------------------------------|-------|-------|--------|--------|--------|-----|
| Latency requirement for SF1  | 0     | 0     | 1      | 0      | 0      | 0   |
| Latency requirement for SF2  | 0     | 0     | 1      | 0      | 0      | 0   |
| Latency requirement for SF3  | 0     | 0     | 1      | 0      | 0      | 0   |
| Latency requirement for SF4  | 0     | 1     | 0      | 0      | 0      | 0   |
| Latency requirement for SF5  | 0     | 1     | 0      | 0      | 0      | 0   |
| Latency requirement for SF6  | 0     | 1     | 0      | 0      | 0      | 0   |

It will be noted that the form of the latency goal matrix is similar to the form of the matrix capturing the latency constraints described earlier as part of the state description. This is because a feature such as a maximum latency may arise at different levels. For example, a feature of a family may be that a particular service requires a maximum latency of (for example) 10 ms for one or more SF. This implies that a latency matrix can be provided as an "additional matrix" as part of the state description as described above.

However, it could also be the case that there is no such latency constraint at a family level. Instead, only a single member of the family (or a subset of the members) has this constraint. This implies that a latency matrix can be provided as a "goal matrix", as described above.

It is also possible that a feature of a family is that a particular service requires a specific maximum latency for one or more SF (implying that a latency matrix can be provided as an "additional matrix" as part of the state description) and that one or more member of the family may have a different (stricter) latency constraint for that same one or more SF or for one or more different SF (implying that a latency matrix can also be provided as a "goal matrix").

Another example of an information element that may be used as a goal matrix is a co-location matrix. For example, in a co-location goal matrix, each row of the matrix may correspond to a respective one of the plurality of service functions, and each column of the co-location goal matrix also corresponds to a respective one of the plurality of service functions. Then, each cell of the co-location goal matrix contains a value 1 if the one of the plurality of service functions corresponding to the respective row should be co-located with the one of the plurality of service functions corresponding to the respective second vector, and otherwise contains a value 0.

The example matrix below indicates that SF3 should be co-located with SF5, SF4 should be co-located with SF5 and SF2 should be co-located with SF6.

|     | SF1 | SF2 | SF3 | SF4 | SF5 | SF6 |
| --- | --- | --- | --- | --- | --- | --- |
| SF1 | 1   | 0   | 0   | 0   | 0   | 0   |
| SF2 | 0   | 1   | 0   | 0   | 0   | 1   |
| SF3 | 0   | 0   | 1   | 0   | 1   | 0   |
| SF4 | 0   | 0   | 0   | 1   | 1   | 0   |
| SF5 | 0   | 0   | 1   | 1   | 1   | 0   |
| SF6 | 0   | 1   | 0   | 0   | 0   | 1   |

Thus, the goal matrix or matrices provide information that is unique to a member, or to a subset of the family, rather than unique to a family.

Figure 11:
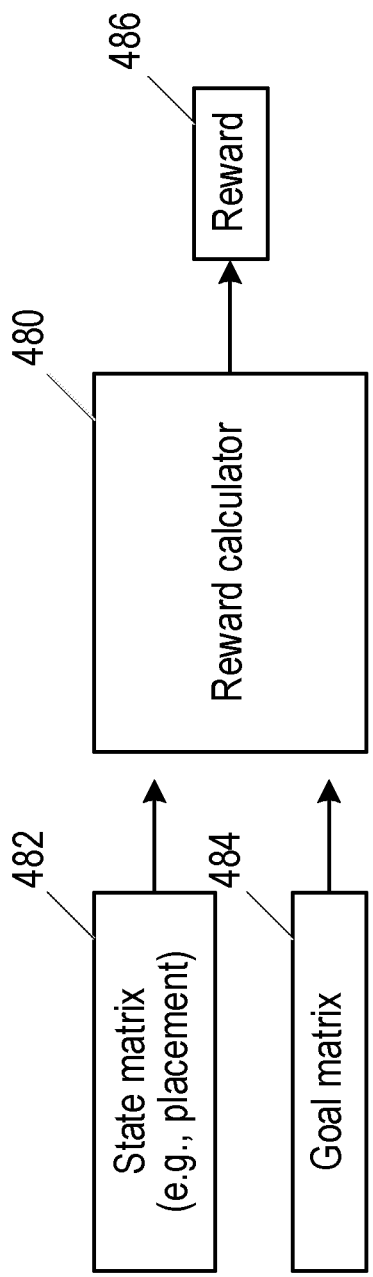
FIG. 11 illustrates a method of reinforcement learning.

FIG. 11 illustrates operation of the reward calculator 480, which takes as its inputs the state matrix 482, consisting of the service set, environment information such as the network topology and the service set placement as described previously. Any goal matrix 484 that is used is also provided as an input to the reward calculator 480.

The agent receives a reward of zero after each action taken as long as the episode has not yet ended. At the end of each episode the agent receives a reward based on how it placed the entire service set. That is, certain criteria must be fulfilled for each service set and the final reward is based on how well it meets these criteria. There are hard and soft criteria: violation of any hard criterion results in a final reward of −1 while soft criteria cannot be violated. Each criterion, when met, can give a value between 0 and 1.

For example, criteria that may be used in calculating the final reward may include:

Network ID: Certain SFs have to be instantiated on specific nodes. For example, some SFs need to be placed on nodes that have a connection to the Internet. This is a hard criterion.

Reachability: All of the uplink SFs have to be instantiated on nodes that have a direct or indirect connection between each other. This also applies to the downlink SFs. This is a hard criterion.

Number of nodes: The smaller the number of nodes that are used for instantiating the entire set of SFs the better. The final reward is therefore greater if the agent places SFs on fewer nodes. This is a soft criterion.

Processing cost: Each node executes SFs at a cost. A placement with a lower total cost therefore yields a greater final reward. This is a soft criterion. The cost may be a static value or may vary with load level of the user plane node. In the latter case, the agent will be trained to adapt to the varying load.

Latency: If a SF instance in the service set has an associated latency, then this must be met. This can be checked by accumulating the latency of predecessor SFs (uplink) or successor SFs (downlink) in the chain.

Co-locations: explicit and implicit co-location constraints must be met.

The final reward is calculated by a weighted sum of all the criteria.

A soft criterion can be defined based on how optimal the resulting routing is. For example, if it is determined that SF A should be traversed before SF B, and SF B should be traversed before SF C, and if user plane node X and Y both are capable of hosting A, B and C, then, if A and C are placed on X but B is placed on Y, the traffic has to pass through SF A on node X, then SF B on node Y, and then SF C on node X. Thus, there is an unnecessary looping of traffic. Each such loop may add a certain reward penalty.

Another reward penalty may be introduced by node hops. For example, if it is determined that SF A should be traversed before SF B, and SF A is placed on node X while SF B is placed on node Y. If the nodes X and Y do not have a direct connection between each other, then the packets from X to Y need to travel through one or more intermediate nodes. A penalty can be added in such a situation. The penalty may be linear to the number of hops.

Another penalty could be imposed when a SF was previously placed on one node, but is now re-placed on a different node, for example due to mobility of the UE. This means that a move of context needs to be performed by the control plane, which can be costly.

Other penalties may arise from constraints related to the type of user. For example, certain user plane nodes may be dedicated for certain types of users. Or, a certain type of users may be prohibited on certain user plane nodes. This way, an operator may for example dedicate several user plane nodes for users that require high availability.

Figure 12:
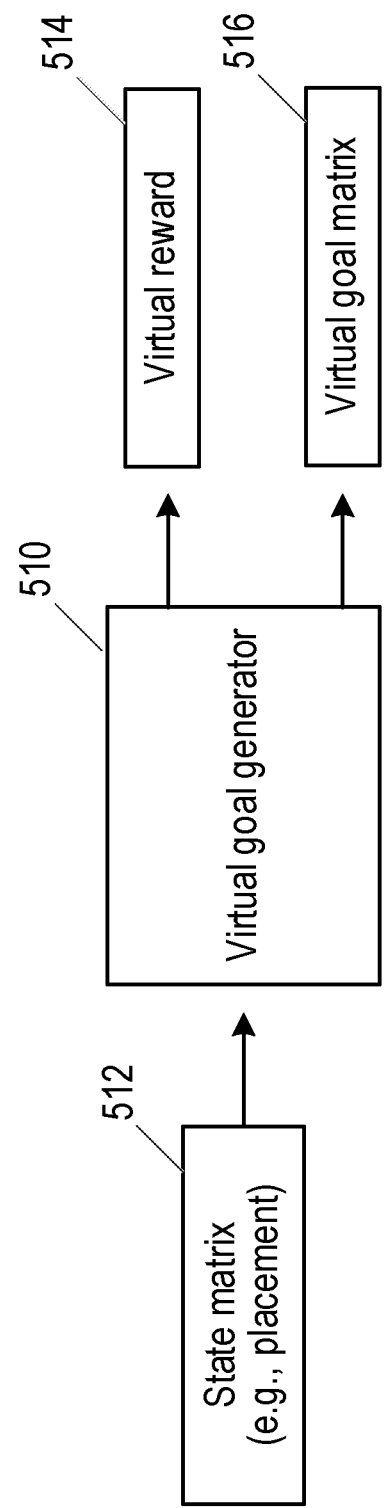
FIG. 12 illustrates a method of reinforcement learning.

FIG. 12 illustrates operation of the virtual goal generator 510, which takes as its inputs the state matrix 512, and generates as outputs a virtual goal matrix 514 and a virtual reward 516. In accordance with the Hindsight Experience Reply technique, the virtual reward 516 has a reasonably high value.

As discussed above, when a certain placement of all SFs in a service set is made by an agent in the training phase, the reward will in many cases be bad, which makes the training slow and unstable. If the training data can be augmented with high reward samples, the training is faster.

The virtual goal generator 510 is therefore used to find a virtual goal in which the corresponding virtual reward is high. A virtual goal can be composed from given SF placements made by an agent where the reward is poor. Depending on the scenario, there exist two different approaches in realizing a virtual goal.

If the running cost of the reward calculator is significantly low and the dimension of goal matrix is small, then the reward calculator can be used in the virtual goal generator as follows.

1) For every possible goal matrix, run a reward calculator and store a (goal matrix, reward) pair in a buffer.
2) Pick a (goal matrix, reward) pair whose reward is high (for example the maximum in the buffer) and output them as a virtual goal matrix 514 and a virtual reward 516.

Thus, the virtual goal generator operates by receiving a placement matrix as described above, and outputs a virtual co-location goal matrix and a virtual reward. First, the virtual co-location goal matrix is initialized by setting it to a zero matrix. Then, for each node the corresponding node row in the placement matrix is selected, and service function (SF) columns whose entry values in the row are 1 (i.e., SFs that are allocated to the node) are identified. If the number of SF columns with value 1 is greater than one, all possible SF pairs among them are stored to a buffer. For each SF pair in the buffer, the value 1 is set to the entry of the corresponding SF row and SF column in the virtual co-location goal matrix. Then, the reward calculator is run with the virtual co-location goal matrix to get a virtual reward, and a virtual co-location goal matrix with an acceptable virtual reward is output.

If the running cost of the reward calculator is not low or the size of goal matrix is high, then, in this case, rather than running the reward calculator many times, the virtual goal converter generator uses several rules to generate a virtual goal. These rules are designed according to which information is used in the goal matrix.

An example of virtual goal matrix generation with a given SF placement can be explained with reference to FIG. 10. In this example, an agent placed SF6 on the Lund site 424. However, SF6 requires a connection to the data network 446, which only the Malmö site 420 is capable of. So, the non-virtual goal indicated that SF6 should be placed in Malmö. In other words, the cell Malmö-SF6 has value "1" in the goal matrix, all other cell for SF6 have value "0", as shown in the following extract of the goal matrix

|        | ... | SF6 | ... |
|--------|-----|-----|-----|
| Malmö  | ... | 1   | ... |
| Kalmar | ... | 0   | ... |
| Lund   | ... | 0   | ... |

The placement shown in FIG. 10 would therefore generate a very low reward, but this would provide little assistance in training the system.

Therefore, as described here, a virtual goal is created: "What if SF6's goal would have been Lund instead of Malmö"

Therefore, in the following virtual goal matrix, cell Lund-SF6 is set to "1" and all other cells in that column are set to "0".

|        | ... | SF6 | ... |
|--------|-----|-----|-----|
| Malmö  | ... | 0   | ... |
| Kalmar | ... | 0   | ... |
| Lund   | ... | 1   | ... |

Accordingly, the original data in the service set or the environment is updated to reflect this. After this, the reward calculator is invoked again, now with the virtual service set and the virtual environment as inputs and the virtual reward as output.

The virtual reward will be higher, and so this will provide more assistance in training the system.

We therefore replace the human-made complex placement algorithm with reinforcement learning technology, thereby simplifying the overall control chain. Input data is translates into a format that an AI agent can handle, and a virtual goal generator is used to augment the training dataset, and thus make the training faster and more stable.

Figure 13:
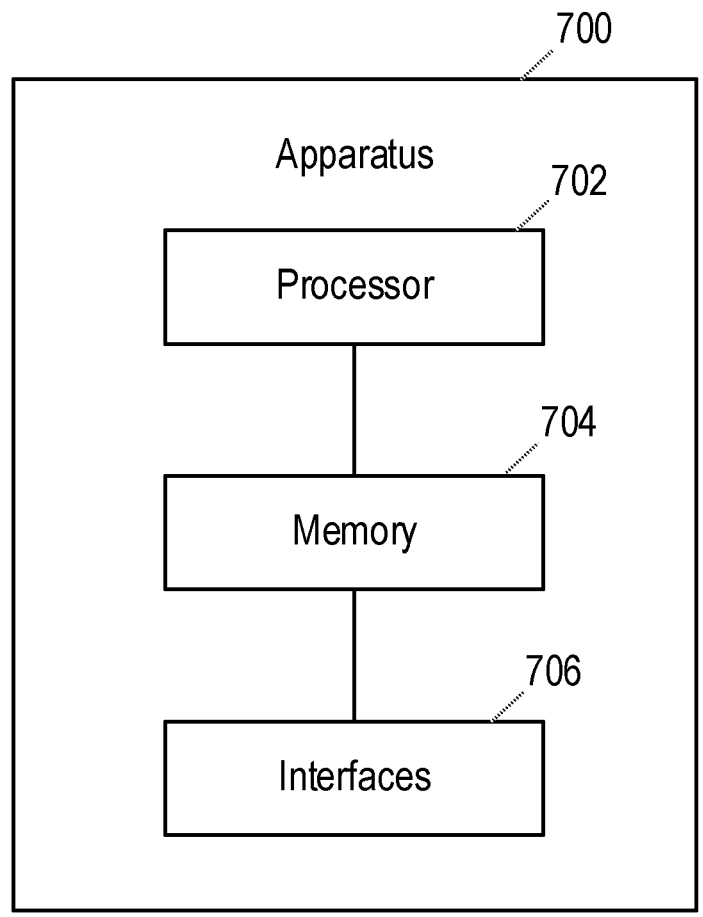
FIG. 13 illustrates an example apparatus which may implement the method of FIG. 8.

The methods of the present disclosure may be conducted in an apparatus for performing reinforcement learning for placement of a plurality of service functions at nodes of a telecommunications network. FIG. 13 illustrates an example apparatus 700 which may implement the methods described herein, for example on receipt of suitable instructions from a computer program. Referring to FIG. 13, the apparatus 700 comprises a processor 702, a memory 704 and Interfaces 706. The memory 704 contains instructions executable by the processor 702 such that the apparatus 700 is operative to conduct some or all of the steps of the methods.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form. The computer program can therefore be provided on a carrier which comprises one of an electronic signal, optical signal, radio signal or computer readable storage medium. A computer program product may comprising non transitory computer readable media having stored thereon such a computer program.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of reinforcement learning for placement of a plurality of service functions at nodes of a telecommunications network, the method comprising:
defining a state of a system by means of an allocation matrix, wherein the state of the system includes an indication of service functions supported in the system, wherein:
each first vector of the allocation matrix corresponds to a respective one of the nodes of the telecommunications network,
each second vector of the allocation matrix corresponds to a respective one of the plurality of service functions, and
each cell of the allocation matrix contains a value 1 if the one of the plurality of service functions corresponding to the respective second vector is placed on the one of the nodes of the telecommunications network corresponding to the respective first vector, and otherwise contains a value 0; and utilizing the allocation matrix as input to train a reinforcement learning (RL) agent to function as a placement algorithm for placing the plurality of service functions among the nodes of the telecommunication network.

2. The method according to claim 1, comprising further defining the state of the system by at least one second matrix, wherein one or more of at least one second matrix contains information specific to a family of service sets that share requirements.

3. The method according to claim 2, comprising further defining the state of the system by a service function type matrix, wherein:
each first vector of the service function type matrix corresponds to a respective type of service function,
each second vector of the service function type matrix corresponds to a respective one of the plurality of service functions, and
each cell of the service function type matrix contains a value 1 if the one of the plurality of service functions corresponding to the respective second vector comprises a service function of the type corresponding to the respective first vector, and otherwise contains a value 0.

4. The method according to claim 2, comprising further defining the state of the system by a key performance indicator matrix, wherein:
each first vector of the key performance indicator matrix corresponds to a respective type of key performance indicator,
each second vector of the key performance indicator matrix corresponds to a respective one of the nodes of the telecommunications network, and
each cell of the key performance indicator matrix contains a value indicating a value of the corresponding key performance indicator for the corresponding one of the nodes of the telecommunications network.

5. The method according to claim 2, comprising further defining the state of the system by an ordering matrix, wherein:
each first vector of the ordering matrix corresponds to a respective one of the plurality of service functions,
each second vector of the ordering matrix also corresponds to a respective one of the plurality of service functions, and
each cell of the ordering matrix contains a value 1 if the one of the plurality of service functions corresponding to the respective first vector should be traversed by data passing through the plurality of service functions before the one of the plurality of service functions corresponding to the respective second vector, and otherwise contains a value 0.

6. The method according to claim 2, comprising further defining the state of the system by a latency constraint matrix, wherein:
each first vector of the latency goal matrix corresponds to a respective one of the plurality of service functions,
each second vector of the latency goal matrix also corresponds to a respective latency value, and
each cell of the latency goal matrix contains a value 1 if the one of the plurality of service functions corresponding to the respective first vector has a latency requirement corresponding to the latency value of the respective second vector, and otherwise contains a value 0.

7. The method according to claim 2, comprising further defining the state of the system by at least one goal matrix, wherein the at least one goal matrix contains information specific to a subset of a family of service sets.

8. The method according to claim 7, comprising further defining the state of the system by a latency goal matrix, wherein:
each first vector of the latency goal matrix corresponds to a respective one of the plurality of service functions,
each second vector of the latency goal matrix also corresponds to a respective latency value, and
each cell of the latency goal matrix contains a value 1 if the one of the plurality of service functions corresponding to the respective first vector has a latency requirement corresponding to the latency value of the respective second vector, and otherwise contains a value 0.

9. The method according to claim 7, comprising further defining the state of the system by a co-location goal matrix, wherein:
each first vector of the co-location goal matrix corresponds to a respective one of the plurality of service functions,
each second vector of the co-location goal matrix also corresponds to a respective one of the plurality of service functions, and
each cell of the co-location goal matrix contains a value 1 if the one of the plurality of service functions corresponding to the respective row should be co-located with the one of the plurality of service functions corresponding to the respective second vector, and otherwise contains a value 0.

10. A method of reinforcement learning for placement of a plurality of service functions at nodes of a telecommunications network, the method comprising:
determining a plurality of possible goal matrices;
running a reward calculator for each of the possible goal matrices, to calculate a respective reward value for each of the possible goal matrices;
selecting one of the calculated reward values; and
outputting the selected one of the calculated reward values and the corresponding one of the possible goal matrices as a virtual reward and a virtual goal matrix, wherein the virtual reward and virtual goal matrix are used as input to train a reinforcement learning (RL) agent to function as a placement algorithm for placing the plurality of service functions among the nodes of the telecommunication network.

11. The method according to claim 10, wherein the step of selecting one of the calculated reward values comprises selecting a largest reward value of the calculated reward values.

12. The method according to claim 10, comprising performing the steps of running the reward calculator for each of the possible goal matrices, selecting one of the calculated reward values, and outputting the selected one of the calculated reward values as a virtual reward and a virtual goal matrix only in response to determining that a cost of running the reward calculator is below a threshold and/or that a dimension of each goal matrix is below a threshold.

13. A computer program comprising instructions which, when executed on at least one processor, cause the at least one processor to carry out a method according to claim 1.

14. A carrier containing a computer program according to claim 13, wherein the carrier comprises one of an electronic signal, optical signal, radio signal or computer readable storage medium.

15. A computer program product comprising non transitory computer readable media having stored thereon a computer program according to claim 13.

16. Apparatus for performing a method of reinforcement learning for placement of a plurality of service functions at nodes of a telecommunications network, the apparatus comprising a processor and a memory, the memory containing instructions executable by the processor such that the apparatus is operable to:
- define a state of a system by an allocation matrix, wherein the state of the system includes an indication of service functions supported in the system, wherein:
- each first vector of the allocation matrix corresponds to a respective one of the nodes of the telecommunications network,
- each second vector of the allocation matrix corresponds to a respective one of the plurality of service functions, and
- each cell of the allocation matrix contains a value 1 if the one of the plurality of service functions corresponding to the respective second vector is placed on the one of the nodes of the telecommunications network corresponding to the respective first vector, and otherwise contains a value 0; and
- utilizing the allocation matrix as input to train a reinforcement learning (RL) agent to function as a placement algorithm for placing the plurality of service functions among the nodes of the telecommunication network.

17. Apparatus for performing a method of reinforcement learning for placement of a plurality of service functions at nodes of a telecommunications network, the apparatus comprising a processor and a memory, the memory containing instructions executable by the processor such that the apparatus is operable to:
- determine a plurality of possible goal matrices;
- run a reward calculator for each of the possible goal matrices, to calculate a respective reward value for each of the possible goal matrices;
- select one of the calculated reward values; and
- output the selected one of the calculated reward values and the corresponding one of the possible goal matrices as a virtual reward and a virtual goal matrix, wherein the virtual reward and virtual goal matrix are used as input to train a reinforcement learning (RL) agent to function as a placement algorithm for placing the plurality of service functions among the nodes of the telecommunication network.

* * * * *